United States Patent
Banerjee et al.

(10) Patent No.: US 9,516,033 B2
(45) Date of Patent: Dec. 6, 2016

(54) PROVIDING RESTRICTED ACCESS TO GIVEN DEVICES BY CONSTRUCTING ABSTRACT DEVICES

(71) Applicant: International Business Machines Corporation, Armonk, NY (US)

(72) Inventors: Nilanjan Banerjee, Bangalore (IN); Pralhad Deshpande, Bangalore (IN); Shalini Kapoor, Bangalore (IN); Palanivel Kodeswaran, Bangalore (IN); Rajan Kumar, Maharashtra (IN); Amit M. Mangalvedkar, New Delhi (IN); Amit A. Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 14/512,634

(22) Filed: Oct. 13, 2014

(65) Prior Publication Data
US 2016/0105441 A1 Apr. 14, 2016

(51) Int. Cl.
H04L 29/06 (2006.01)
(52) U.S. Cl.
CPC .......... *H04L 63/102* (2013.01); *H04L 63/105* (2013.01)
(58) Field of Classification Search
None
See application file for complete search history.

(56) References Cited

U.S. PATENT DOCUMENTS

| | | | |
|---|---|---|---|
| 7,257,815 B2* | 8/2007 | Gbadegesin | H04L 63/101 709/229 |
| 7,594,007 B2 | 9/2009 | Kushalnagar et al. | |
| 8,171,485 B2* | 5/2012 | Muller | G06F 9/5027 709/223 |
| 8,245,280 B2 | 8/2012 | Song et al. | |
| 8,438,654 B1* | 5/2013 | von Eicken | G06F 21/53 709/217 |
| 8,578,374 B2* | 11/2013 | Kane | G06F 9/45558 718/1 |
| 8,726,343 B1 | 5/2014 | Borzycki et al. | |
| 2006/0265711 A1* | 11/2006 | Bantz | G06F 9/4443 718/1 |
| 2007/0198522 A1* | 8/2007 | Britton | G06F 21/629 |

(Continued)

*Primary Examiner* — Christopher Revak
(74) *Attorney, Agent, or Firm* — Ryan, Mason & Lewis, LLP

(57) ABSTRACT

Methods, systems, and computer program products for providing restricted access to given devices by constructing abstract devices are provided herein. A method includes generating a virtual device based on one or more physical devices; mapping multiple device actions of the one or more physical devices to multiple device actions of the virtual device exposed by the virtual device; incorporating (i) discretionary access control techniques, (ii) policy-based access control techniques, and (iii) a physical device-level partial ordering of actions to determine a resolution in response to a set of multiple user access requests for two or more of the multiple device actions of the virtual device; and executing the two or more device actions of the virtual device on the virtual device for one or more given users in accordance with said resolution by coordinating the execution of two or more corresponding device actions of the one or more physical devices on the one or more physical devices based on said mapping.

17 Claims, 6 Drawing Sheets

(56) References Cited

U.S. PATENT DOCUMENTS

| | | | |
|---|---|---|---|
| 2011/0154325 A1* | 6/2011 | Terasaki | G06F 9/455 718/1 |
| 2014/0068718 A1* | 3/2014 | Mureinik | G06F 21/604 726/4 |
| 2014/0096134 A1* | 4/2014 | Barak | G06F 9/45558 718/1 |
| 2014/0181502 A1* | 6/2014 | Lvovsky | G06F 9/4411 713/100 |

* cited by examiner

PROVIDING RESTRICTED ACCESS TO GIVEN DEVICES BY CONSTRUCTING ABSTRACT DEVICES

FIELD OF THE INVENTION

Embodiments of the invention generally relate to information technology, and, more particularly, to device access control techniques.

BACKGROUND

Commonly, in a home, business, and/or recreational setting, there are numerous user devices present, each carrying out (or attempting to carry out) one or more actions. Additionally, there are often multiple users who are to be provided different levels of access to such user devices. Further, it may be desirable to provide restricted access to a given combinations of devices, rather than to individual devices. For example, it may be desired to allow an individual to set the temperature of a given room, only within a certain temperature range, and without giving the individual access to the individual fans and/or air conditioning units in the given room.

Also, it may be desirable to provide restricted device access to a given individual and/or set of individuals. For example, consider a hospital room setting, wherein multiple devices are present for measuring patient information. Additionally, the hospital room may include controls to adjust room temperature, lighting, bed position, etc., and a patient may also bring his or her own devices that need to be accessible to doctors and/or nurses.

However, existing role-based access control (RBAC) approaches do not provide capabilities to manage a setting wherein a given individual or set of individuals need to be afforded opportunistic access because the set of resources and users in the system continues to change. Accordingly, a need exists for techniques that provide an abstract (virtual) device with abstract controls to provide the level of access that is intended and/or desired for a given setting.

SUMMARY

In one aspect of the present invention, techniques for providing restricted access to given devices by constructing abstract devices are provided. An exemplary computer-implemented method can include steps of generating a virtual device based on one or more physical devices; mapping multiple device actions of the one or more physical devices to multiple device actions of the virtual device exposed by the virtual device; incorporating (i) discretionary access control techniques, (ii) policy-based access control techniques, and (iii) a physical device-level partial ordering of actions to determine a resolution in response to a set of multiple user access requests for two or more of the multiple device actions of the virtual device; and executing the two or more device actions of the virtual device on the virtual device for one or more given users in accordance with said resolution by coordinating the execution of two or more corresponding device actions of the one or more physical devices on the one or more physical devices based on said mapping.

In another aspect of the invention, an exemplary computer-implemented method can include steps of generating a virtual device based on one or more of multiple physical devices; mapping multiple device actions of the one or more physical devices to multiple device actions of the virtual device exposed by the virtual device; and receiving multiple access requests to two or more of the multiple device actions of the virtual device from multiple users and/or two or more of the multiple physical devices. The method also includes steps of decomposing each of the multiple access requests to a set of physical device-level access requests; forwarding each physical device-level access request to one or more corresponding physical devices among the multiple physical devices; collating each individual physical device-level access decision in response to each physical device-level access request; and executing, in accordance with said collating, the two or more device actions of the virtual device on the virtual device by coordinating the execution of two or more corresponding device actions of the one or more physical devices on the one or more physical devices based on said mapping.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
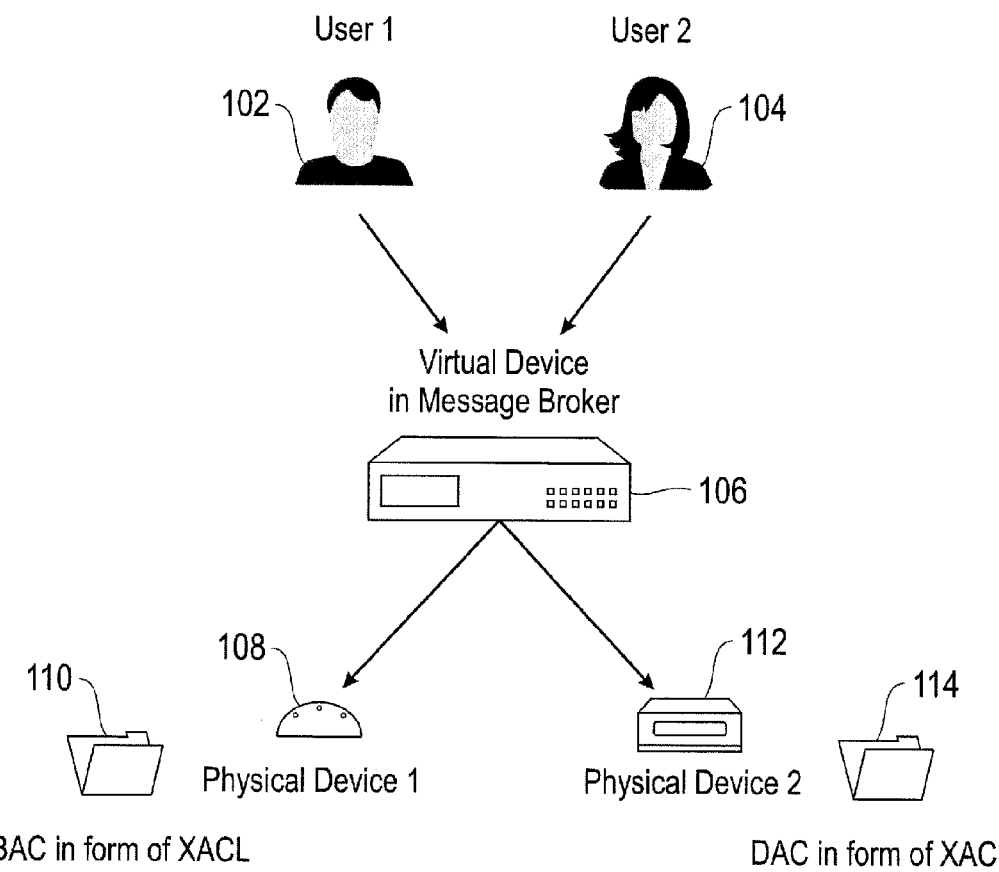
FIG. 1 is a diagram illustrating an aspect of the present invention.

As described herein, an aspect of the present invention includes techniques for providing restricted access to devices by generating abstract devices and actions. At least one embodiment of the invention includes generating and/or providing an abstract (that is, virtual) device with abstract controls to provide the level of access that is intended and/or desired for a given setting. Such an abstract device and related controls can carry out individual actions on one or more component devices in accordance with a set of one or more access rules.
}

As additionally described herein, at least one embodiment of the invention includes utilizing a combination of discretionary access control (DAC), policy-based access control (PBAC) and device-level partial ordering of services to grant or deny access requests to abstract device services. Further, one or more embodiments of the invention include utilizing a broker-based system for decomposing and forwarding component device-level access requests and collating individual level access decisions to execute abstract actions.

By way of illustration, an example embodiment of the invention can include providing authorization(s) for device compositions across a set of devices, $D=\{D_1, D_2 \ldots, D_n\}$ and a set of known users, $U=\{U_1, U_2 \ldots, U_m\}$. In such an example embodiment, for each $D_i$, the set of device services is $S=\{S_1, S_2 \ldots, S_k\}$. As such, a virtual device service, composed of two devices $D_1$ and $D_2$, offering a composite service $S_A$, can be composed as follows: $D_1D_2S_A=D_1S_j\odot D_2S_k$, and $Eval(D_1D_2S_A, U_i)=Eval(D_1S_j, U_i)$ and $Eval(D_2S_k, U_i)$. Here, "$\odot$" is the composition operator, and Eval(.) is a function that evaluates whether the user $U_i$ can access the requested service $S_i$ (virtual or physical device-level). The Eval function combines DAC, PBAC and device-level service ordering to determine if a user should be provided access to a service, as further described below.

As noted herein, at least one embodiment of the invention includes combining rules and/or policies and DAC techniques for device access control. In carrying out DAC-based authorization resolution, for each device $D_i$, the user specifies a DAC table which authorizes and denies principals (users) for specific device services. Additionally, policy-based authorization resolution can be carried out, for example, as follows: Allow($D_1S_1$, $U_i$):Role(Friend, $U_i$) and GeoFence($U_i$, Circle(50 feet)), which allows unknown users to request and be granted access under certain circumstances. Here, Allow(.) is a predicate that returns a true or false status based on whether $U_i$ is allowed access or not. The above rule states that a user $U_i$ is allowed access if $U_i$ is a friend (that is, is on a given list of friends) indicated by the true/false predicate function Role(.,.) AND if $U_i$ is within 50 feet of the device. GeoFence(.,<dist>) is a predicate which indicates whether a user is within a particular distance of the device or not, and Circle(.) is a function, an instance of <dist>, which evaluates an area based on the radius specified.

Also, partial ordering of services-based access resolution can include implementing a per device partial ordering such as, for example, $S_1<S_2$ and $S_4<S_5$. In such an example, if $U_i$ is provided access to $S_2$, then $U_i$ can be provided access to $S_1$ as well. Partial ordering can be used, for example, in request evaluations wherein rule-based resolution or DAC is not sufficient for access resolution.

FIG. 1 is a diagram illustrating an aspect of the present invention. By way of illustration, FIG. 1 depicts a first user 102, a second user 104, a virtual device in a message broker 106, a first physical device 108 and a second physical device 112. The first physical device 108 includes PBAC 110 in the form of extensible markup language (XML) access control markup language (XACML), and the second physical device 112 includes DAC 114 in the form of XACML.

As such, in accordance with the example embodiment of the invention depicted in FIG. 1, the centralized message broker 106 acts as a coordinator for access request mediation among users 102 and 104 and devices 108 and 112. All access requests for a composite service are forwarded from user 102 and/or user 104 to the message broker 106. The message broker 106 decomposes each service request, forwards each request to device 108 and/or device 112 for a local service access determination (with the relevant and/or corresponding device). Additionally, the message broker 106 combines access decisions from device 108 and device 112 and evaluates access to a composite service. Combining access decisions includes collating access control decisions from individual devices and evaluating includes determining the particular access to provide depending upon the collected access control decisions. If all device-level access control decisions return true, access is provided to the requesting user.

Device-level compositions commonly involve devices owned by the same user or devices owned by other users who participate in the composition for mutual benefit among the users. However, other settings can differ in that even users with no participating devices can request access to the composed device. This can be found, for example, in machine-to-machine (M2M) environments, wherein the number of devices are often many, and their possible combinations are potentially exponential. Such a setting precludes statically authoring access control rules for all possible combinations.

Accordingly, at least one embodiment of the invention includes combining DAC, PBAC and device-level partial orderings, as well as mediating access requests to an abstract service and executing the access requests on one or more given component devices. By way of illustration, when two M2M devices come together to form an abstract device, the security policy for the new joint abstract device is to be determined at run-time. For example, consider a scenario wherein a first user owns a television and a second user owns a Bluetooth- (or infrared (IR)) enabled phone, while the second user is not permitted to change the channel on the television using Bluetooth/IR.

In such an example, conflict resolution can include considerations of priority and semantics to determine an overriding policy when two or more policies overlap. Additionally, such considerations can be made on the basis of the given action(s) as well as on the basis of the given user(s). As detailed herein, at least one embodiment of the invention can also include implementing a partial order on actions.

Continuing with the above example, the given actions can be considered as follows: a fundamental action includes changing the channel on the television, while an extended and/or modified action includes changing the channel on the television using Bluetooth or infrared. Additionally, in this example, consider $A_i$ as representing a series of entertainment actions, and $B_i$ as representing a series of actions pertaining to networking. As such, an example embodiment of the invention can include making the following determination: $A_i>>B_i$. A priority determination is exemplified below, and can be, for example, user-provided based on a perceived sensitivity of given resources.

Figure 2:
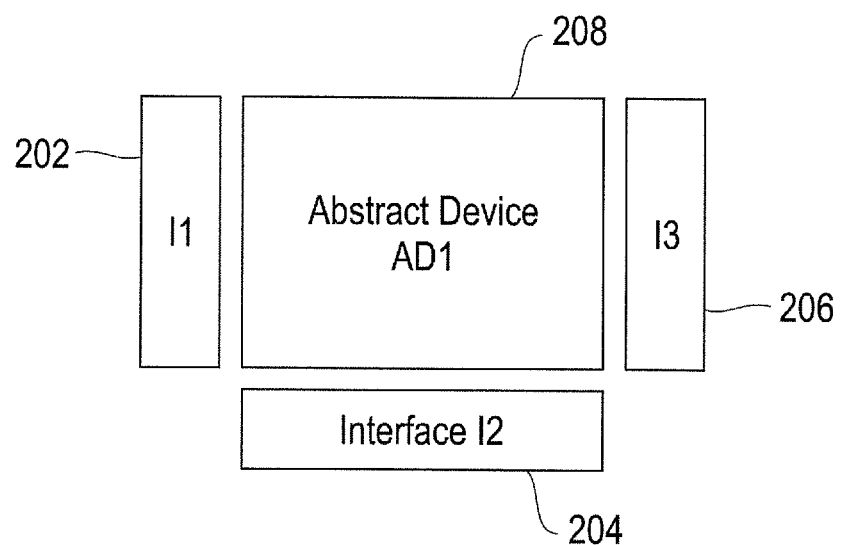
FIG. 2 is a diagram illustrating an aspect of the present invention.

FIG. 2 is a diagram illustrating an aspect of the present invention. By way of illustration, FIG. 2 depicts a first user interface (UI) 202 (I1), a second UI 204 (I2), a third UI 206 (I3), and an abstract device (AD) 208 (AD1). By way of example, assume that UI 202 represents a control UI, UI 204 represents a management UI, UI 206 represents a repair UI, and AD 208 represents an entertainment device. Additionally, in accordance with such an example, consider the below table, which identifies the permissible access status of each of the listed user roles for each of UI 202, UI 204 and UI 206.

| User Roles | UI 202 | UI 204 | UI 206 |
|---|---|---|---|
| Administrator | Yes | Yes | Yes |
| Main/associated user | Yes | Yes | No |
| Guest | Yes | No | No |
| Cleaning personnel | No | No | No |

Accordingly, an example embodiment of the invention, in connection with the example scenario as detailed above in connection with FIG. 2, includes creating and/or providing an abstract (virtual) device such as AD 208 with abstract switches (controls) to provide the level of access that is intended and/or desired for each of one or more individuals. The abstract device 208 carries out the individual actions on the component devices via UI 202, UI 204 and UI 206 in accordance with a set of one or more access rules. A rule engine, resident in the abstract device 208, for example, generates such access rules based on the rules provided. For example, a user can provide one or more rules for the devices owned by that user.

Figure 3:
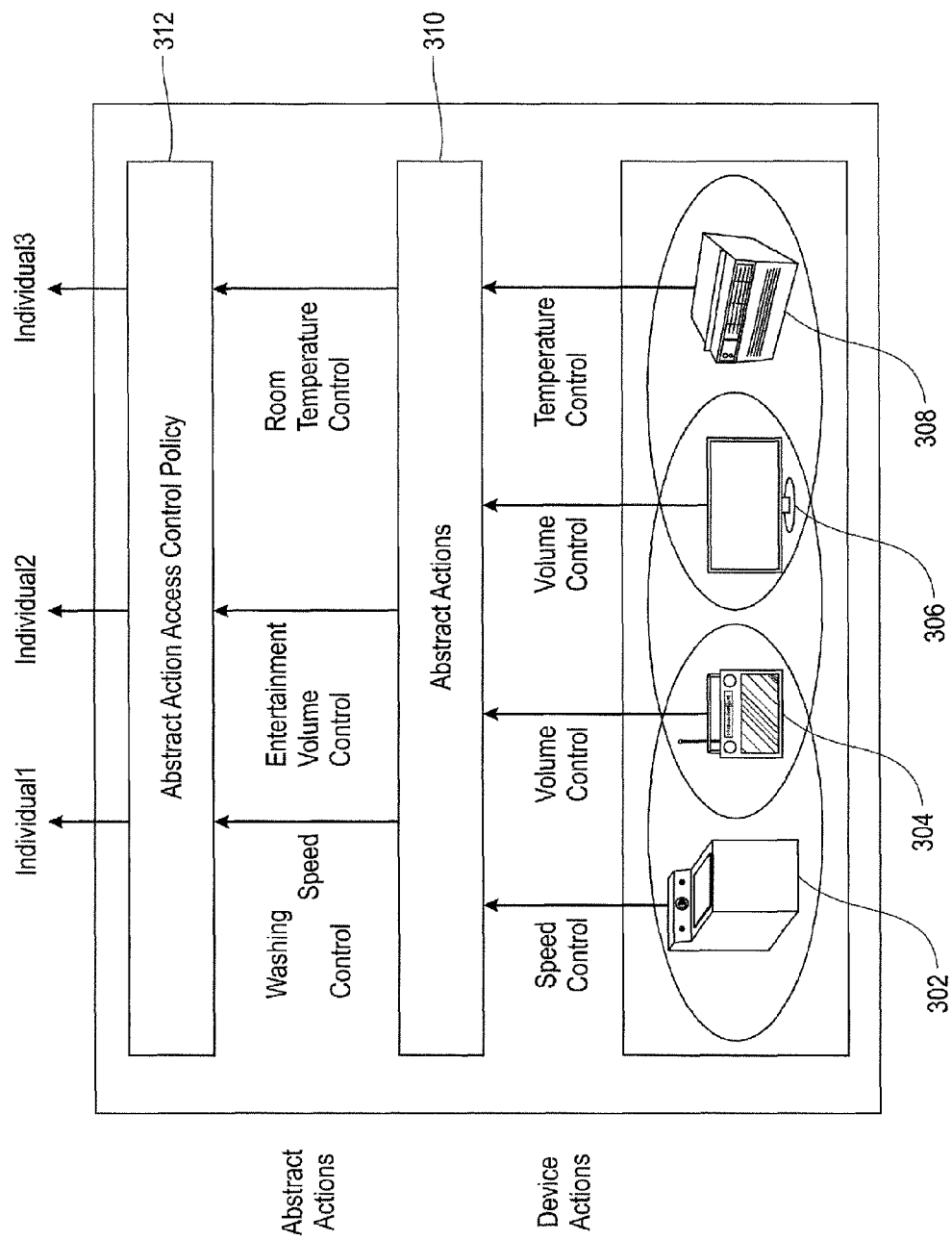
FIG. 3 is a diagram illustrating an aspect of the present invention.

FIG. 3 is a diagram illustrating an aspect of the present invention. By way of illustration, FIG. 3 depicts devices 302, 304, 306 and 308 that are associated with given device actions. By way of example, device 302 can include a washing machine, which corresponds to a device action of speed control. Additionally, device 304 can include a radio, which corresponds to a device action of volume control. Also, device 306 can include a television, which corresponds to a device action of volume control. Further, device 308 can include an air conditioning unit, which corresponds to a device action of temperature control.

FIG. 3 also depicts an abstract actions component 310, which provides input in the form of one or more abstract action descriptions to an abstract action access control policy component 312, which ultimately facilitates access determinations in connection with one or more individuals (such as Individual1, Individual2, and Individual 3, as depicted in FIG. 3). Typical examples of device actions can include speed control of the drum in a washing machine, volume control of a radio, volume control of a television, and temperature control of air conditioner.

Accordingly, at least one embodiment of the invention includes providing granularity of access control, wherein multiple types of access can be provided from the same combination of devices to multiple users by creating multiple abstractions. Additionally, one or more embodiments of the invention include enabling support for multiple models, wherein, for instance, different individuals may want or require different abstractions for a given set of devices. Multiple model support can be implemented via the access rules specified by the user which determines the abstract device that is created. Additionally, it is assumed in one or more embodiments of the invention that each user generates only one set of access rules for his or her devices.

As detailed herein, access control scenarios encompassed by one or more embodiments of the invention can include real actions and abstract actions. Real actions include actual device capability such as, for example, turning a device on or off, increasing or decreasing volume on a specific device, etc. Abstract actions include actions composed from one or more real actions on one or more devices. A typical example can include a volume decrease, which can refer to decreasing the volume of a radio and/or television. In at least one embodiment of the invention, only abstract actions are exposed to external users.

Further, one or more embodiments of the invention include rule-based abstract access, which can include utilization of one or more human-specified rules. Such human-specified rules can take the form, for example, of A → B. Here "A" is referred to as the antecedent or the precedent, and "B" is referred to as the consequent of the rule. One type of rule implemented by at least one embodiment of the invention includes a rule in which all antecedents and consequents are real actions. For example, such a rule might include the following: TV.on → Radio.off and Light. Dimmed With such a rule, the precedent of the rule is exposed as an abstract action.

A second type of rule implemented by at least one embodiment of the invention includes a rule in which an antecedent or a consequent contains a virtual action. A virtual action, as noted above, is an action that is not directly tied to a specific device capability. For example, such a rule might include the following: TurnOffAllEntertainment$_{virtual}$ → TV.off and Radio.off. With this example rule, TurnOffAllEntertainment$_{virtual}$ is a virtual action introduced by the user. Virtual actions can also be exposed as abstract actions as well.

Figure 4:
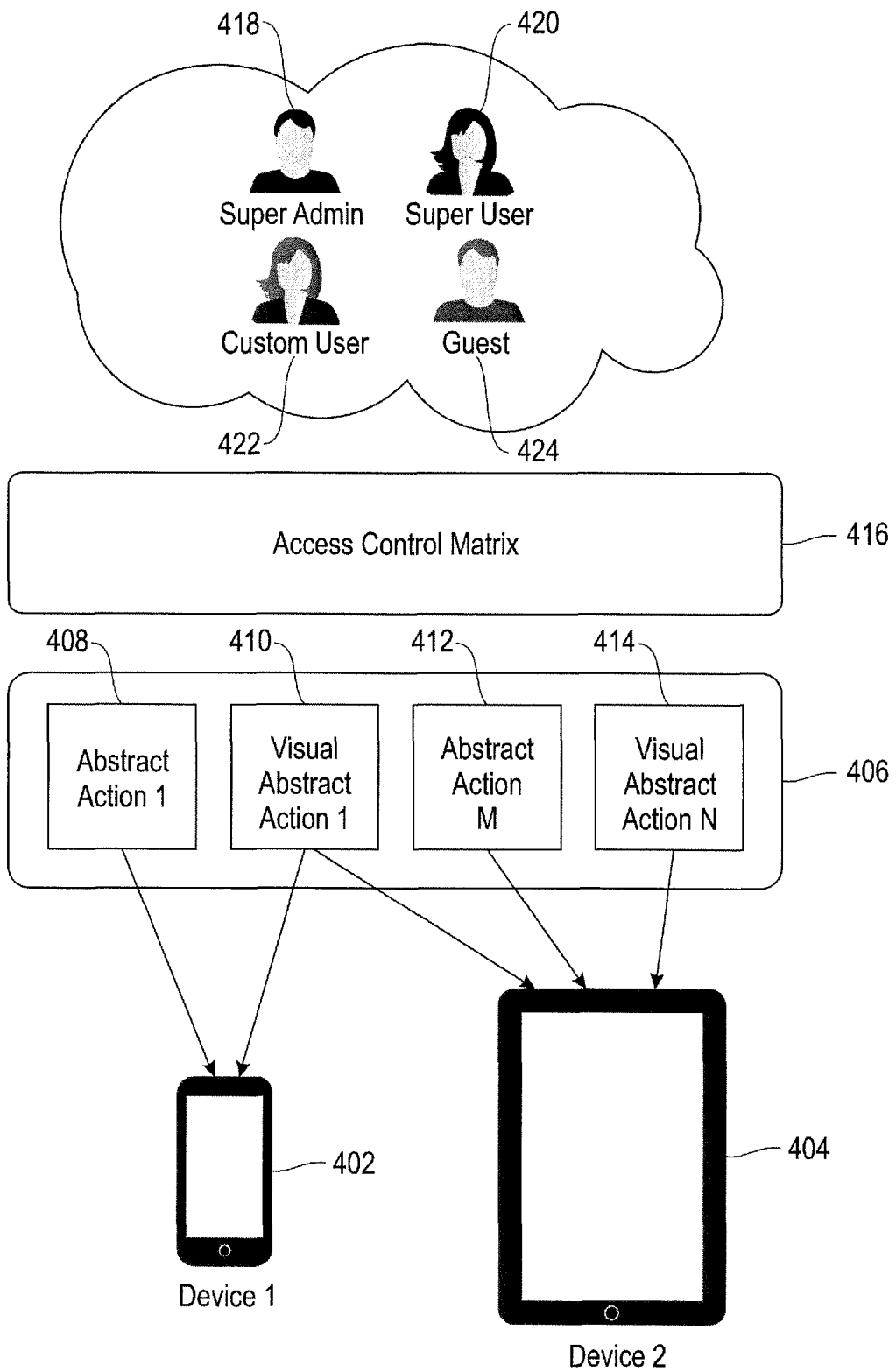
FIG. 4 is a diagram illustrating an aspect of the present invention.

FIG. 4 is a diagram illustrating an aspect of the present invention. By way of illustration, FIG. 4 depicts a first device 402, a second device 404, a representational state transfer-(REST)-based abstract actions repository 406, an access control matrix component 416, as well as a set of users (and/or user roles) including a super administrator 418, a super user 420, a custom user 422 and a guest 424. As also depicted in FIG. 4, the REST-based abstract actions repository 406 includes a first abstract action 408, a first virtual abstract action 410, abstract action M 412, and virtual abstract action N 414. As used herein, an "abstract action" is an action that applies to a single device, whereas a "virtual abstract action" is an action that applies to multiple devices. A virtual abstract action can include cases wherein there are multiple actions on the same device.

The access control matrix component 416 maintains a mapping between the various users (such as users 418, 420, 422 and 424) and the abstract actions (such as those identified in repository 414) to which each given user (or user role) has access. For example, a user can generate the mapping by authoring the DAC table and PBAC rules. Additionally, devices such as devices 402 and 404 can include adapters which enable communication between the devices and one or more actions.

Access control provided in accordance with one or more embodiments of the invention can result in an increased number and range of parameters over which access control may be based (for example, device battery level, communication link capability, etc.). Also, access control can be used for personalized (or role-based) quality of service (QoS) implementations. For example, one way to ensure QoS is to incorporate available battery level of devices in access control decisions, and provide access only if the battery level is above a user-specified threshold. Further, at least one embodiment of the invention includes incorporating one or more social networking aspects. For example, devices of friends can join or become associated and provide abstract interfaces.

Figure 5:
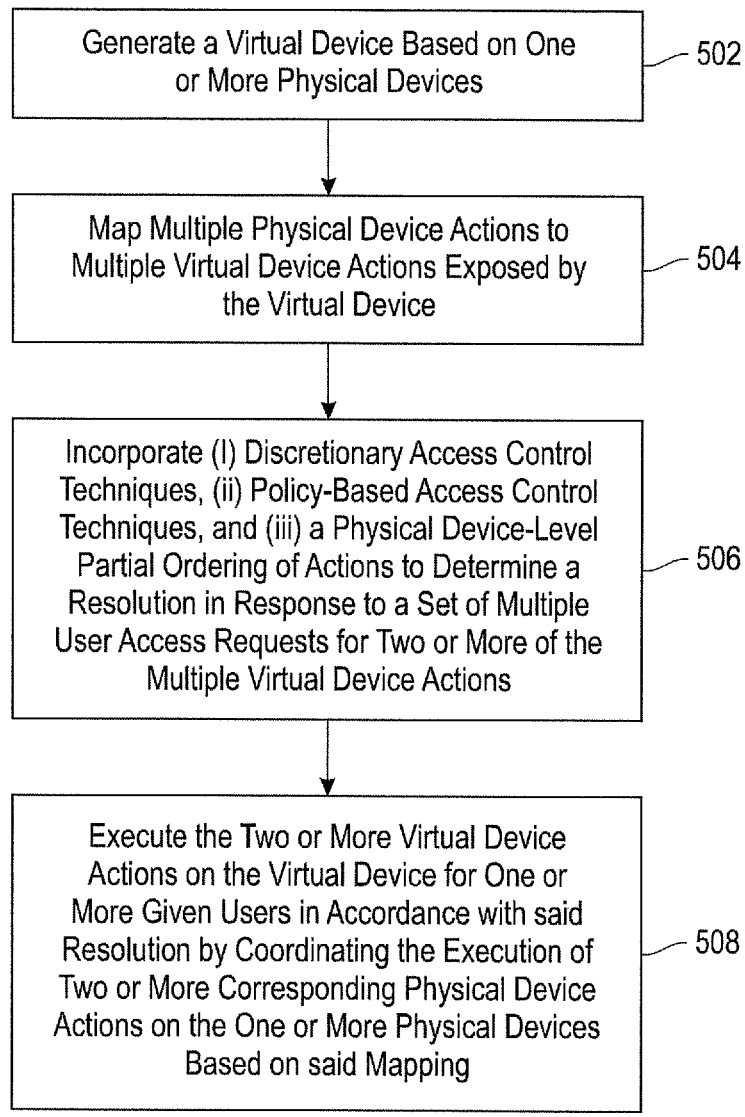
FIG. 5 is a flow diagram illustrating techniques according to an embodiment of the invention.

FIG. 5 is a flow diagram illustrating techniques according to an embodiment of the invention. Step 502 includes generating a virtual device based on one or more physical devices. The physical devices can include a single type of physical device or multiple types of physical devices.

Step 504 includes mapping multiple device actions of the one or more physical devices to multiple device actions of the virtual device exposed by the virtual device. Each of the multiple device actions of the one or more physical devices includes a capability associated with a given physical device, while each of the multiple device actions of the virtual device includes an action derived from one or more device actions of the one or more physical devices that is applicable to one or more of the physical devices.

Step 506 includes incorporating (i) discretionary access control techniques, (ii) policy-based access control techniques, and (iii) a physical device-level partial ordering of actions to determine a resolution in response to a set of multiple user access requests for two or more of the multiple device actions of the virtual device. The multiple user access requests can be provided by a single user or by multiple distinct users.

Step 508 includes executing the two or more device actions of the virtual device on the virtual device for one or more given users in accordance with said resolution by coordinating the execution of two or more corresponding device actions of the one or more physical devices on the one or more physical devices based on said mapping. In at least one embodiment of the invention, the one or more given users are not known a priori.

The techniques depicted in FIG. 5 can also include specifying one or more rules associated with each of the multiple device actions of the virtual device, as well as specifying a role associated with each of the one or more given users. Accordingly, such an embodiment of the invention can include incorporating (i) discretionary access control techniques, (ii) policy-based access control techniques, (iii) a physical device-level partial ordering of actions, and (iv) the role associated with each of the one or more given users to determine a resolution in response to the set of multiple user access requests for the two or more of the multiple device actions of the virtual device. Further, at least one embodiment of the invention can include generating an access control matrix for mapping said role associated with each of the one or more given users and each of the multiple device actions of the virtual device to which each role has access.

Additionally, the techniques depicted in FIG. 5 can include incorporating (i) discretionary access control techniques, (ii) policy-based access control techniques, (iii) a physical device-level partial ordering of actions, and (iv) one or more context attributes to determine a resolution in response to the set of multiple user access requests for the two or more of the multiple device actions of the virtual device. The context attributes can include battery level of the one or more physical devices and/or communication link capability of the one or more physical devices. Additionally, the context attributes can include user location and/or one or more social networking connections associated with the one or more given users.

As also detailed herein, at least one embodiment of the invention can include an example method including steps of generating a virtual device based on one or more of multiple physical devices; mapping multiple device actions of the one or more physical devices to multiple device actions of the virtual device exposed by the virtual device; and receiving multiple access requests to two or more of the multiple device actions of the virtual device from multiple users and/or two or more of the multiple physical devices. The example method also includes steps of decomposing each of the multiple access requests to a physical device-level access request; forwarding each physical device-level access request to one or more corresponding physical devices among the multiple physical devices; collating each individual physical device-level access decision in response to each physical device-level access request; and executing, in accordance with said collating, the two or more device actions of the virtual device on the virtual device by coordinating the execution of two or more corresponding device actions of the one or more physical devices on the one or more physical devices based on said mapping.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 6:
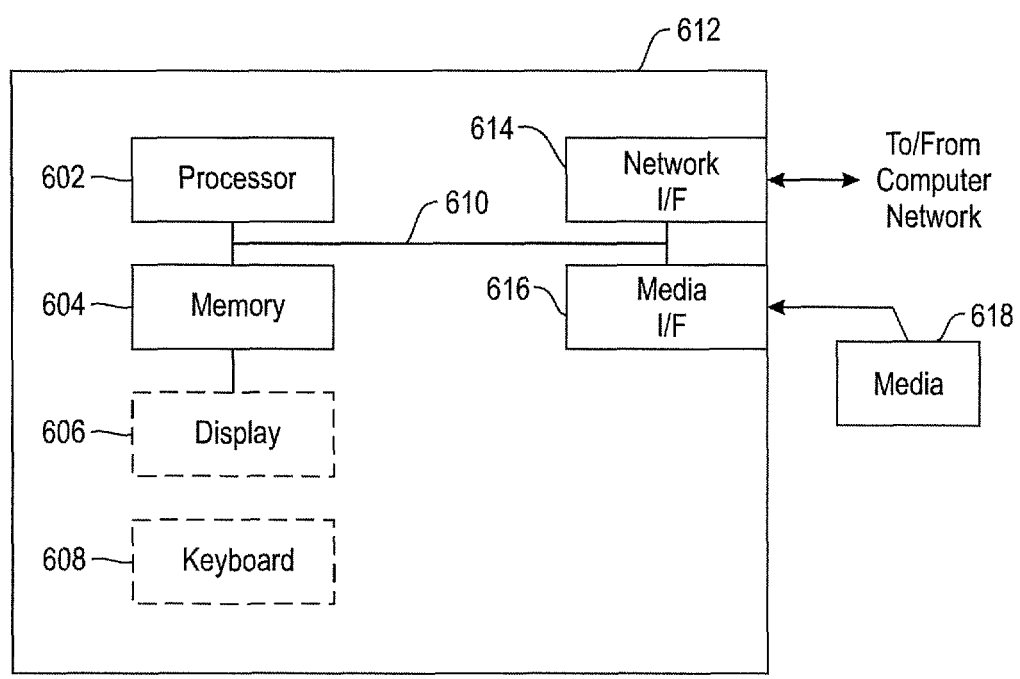
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, dynamically generating a virtual device to facilitate controlling user access to one or more individual physical devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising the following steps:
generating a virtual device based on one or more physical devices;
mapping multiple device actions of the one or more physical devices to multiple device actions of the virtual device exposed by the virtual device;
specifying a role associated with each of one or more given users;
incorporating (i) discretionary access control techniques, (ii) policy-based access control techniques, (iii) a physical device-level partial ordering of actions, and (iv) the role associated with each of the one or more given users to determine a resolution in response to a set of multiple user access requests for two or more of the multiple device actions of the virtual device; and
executing the two or more device actions of the virtual device on the virtual device for the one or more given users in accordance with said resolution by coordinating the execution of two or more corresponding device actions of the one or more physical devices on the one or more physical devices based on said mapping;
wherein the steps is carried out by at least one computing device.

2. The method of claim 1, comprising:
generating an access control matrix for mapping said role associated with each of the one or more given users and each of the multiple device actions of the virtual device to which each role has access.

3. The method of claim 1, comprising:
specifying one or more rules associated with each of the multiple device actions of the virtual device.

4. The method of claim 1, wherein the one or more given users are not known a priori.

5. The method of claim 1, wherein the one or more physical devices comprise a single type of physical device.

6. The method of claim 1, wherein the one or more physical devices comprise two or more physical devices comprising multiple types of physical devices.

7. The method of claim 1, comprising:
incorporating (i) discretionary access control techniques, (ii) policy-based access control techniques, (iii) a physical device-level partial ordering of actions, (iv) the role associated with each of the one or more given users, and (v) one or more context attributes to determine a resolution in response to the set of multiple user access requests for the two or more of the multiple device actions of the virtual device.

8. The method of claim 7, wherein said one or more context attributes comprise battery level of the one or more physical devices and/or communication link capability of the one or more physical devices.

9. The method of claim 7, wherein said one or more context attributes comprise user location and/or one or more social networking connections associated with the one or more given users.

10. The method of claim 1, wherein each of said multiple device actions of the one or more physical devices comprises a capability associated with a given physical device.

11. The method of claim 1, wherein each of said multiple device actions of the virtual device comprises an action derived from one or more device actions of the one or more physical devices that is applicable to one or more of the physical devices.

12. The method of claim 1, wherein the multiple user access requests are provided by a single user.

13. The method of claim 1, wherein the multiple user access requests are provided by multiple distinct users.

14. A computer program product, the computer program product comprising a computer readable storage medium having program instructions embodied therewith, the program instructions executable by a computing device to cause the computing device to:
generate a virtual device based on one or more physical devices;
map multiple device actions of the one or more physical devices to multiple device actions of the virtual device exposed by the virtual device;
specify a role associated with each of one or more given users;
incorporate (i) discretionary access control techniques, (ii) policy-based access control techniques, (iii) a physical device-level partial ordering of actions, and (iv) the role associated with each of the one or more given users to determine a resolution in response to a set of multiple user access requests for two or more of the multiple device actions of the virtual device; and
execute the two or more device actions of the virtual device on the virtual device for the one or more given users in accordance with said resolution by coordinating the execution of two or more corresponding device actions of the one or more physical devices on the one or more physical devices based on said mapping.

15. The computer program product of claim 14, wherein the program instructions executable by a computing device further cause the computing device to:
generate an access control matrix for mapping said role associated with each of the one or more given users and each of the multiple device actions of the virtual device to which each role has access.

16. A system comprising:
a memory; and
at least one processor coupled to the memory and configured for:
generating a virtual device based on one or more physical devices;
mapping multiple device actions of the one or more physical devices to multiple device actions of the virtual device exposed by the virtual device;
specifying a role associated with each of one or more given users;
incorporating (i) discretionary access control techniques, (ii) policy-based access control techniques, (iii) a physical device-level partial ordering of actions, and (iv) the role associated with each of the one or more given users to determine a resolution in response to a set of multiple user access requests for two or more of the multiple device actions of the virtual device; and
executing the two or more device actions of the virtual device on the virtual device for the one or more given users in accordance with said resolution by coordinating the execution of two or more corresponding device actions of the one or more physical devices on the one or more physical devices based on said mapping.

17. A method comprising the following steps:
generating a virtual device based on one or more of multiple physical devices;
mapping multiple device actions of the one or more physical devices to multiple device actions of the virtual device exposed by the virtual device;
receiving multiple access requests to two or more of the multiple device actions of the virtual device from multiple users and/or two or more of the multiple physical devices;
specifying a role associated with each of the multiple users;
decomposing each of the multiple access requests to a physical device-level access request;
forwarding each physical device-level access request to one or more corresponding physical devices among the multiple physical devices;
collating each individual physical device-level access decision in response to each physical device-level access request based on the role associated with each of the users; and
executing, in accordance with said collating, the two or more device actions of the virtual device on the virtual device by coordinating the execution of two or more corresponding device actions of the one or more physical devices on the one or more physical devices based on said mapping;
wherein the steps is carried out by at least one computing device.

* * * * *